United States Patent
Sano et al.

(10) Patent No.: US 6,970,776 B2
(45) Date of Patent: Nov. 29, 2005

(54) COMMUNICATION ERROR DETECTING METHOD FOR BUS COMMUNICATION NETWORK IN VEHICLE

(75) Inventors: Yoshiaki Sano, Aichi (JP); Kenji Hayase, Aichi (JP); Toshiki Fukaya, Aichi (JP); Toshiyuki Abe, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 183 days.

(21) Appl. No.: 10/650,929

(22) Filed: Aug. 29, 2003

(65) Prior Publication Data

US 2004/0225417 A1  Nov. 11, 2004

(30) Foreign Application Priority Data

Aug. 30, 2002 (JP) .......................... P.2002-255029

(51) Int. Cl.⁷ ......................... G01M 17/007; H04L 1/60
(52) U.S. Cl. ......................................... 701/33; 701/29
(58) Field of Search ................................... 701/29, 33

(56) References Cited

U.S. PATENT DOCUMENTS 5,398,238 A * 3/1995 Inagawa et al. ............ 370/294
5,486,817 A * 1/1996 Ina ............................. 340/3.42
6,385,166 B1 * 5/2002 Takagi et al. ................ 370/222
6,484,082 B1 * 11/2002 Millsap et al. ................ 701/48

FOREIGN PATENT DOCUMENTS

JP  7-23722 Y2  5/1995

* cited by examiner

*Primary Examiner*—Michael J. Zanelli
(74) *Attorney, Agent, or Firm*—Birch, Stewart, Kolasch & Birch, LLP

(57) ABSTRACT

A communication error detecting method for a bus communication network including a first type ECU which is powered on whether an ignition key is situated at an ON position or a cranking position and a second type ECU which is powered on when the ignition key is situated at the ON position and which is powered off when the ignition key is situated at the cranking position. The communication error detecting method includes: selecting a predetermined detecting mode from a plurality of detecting modes according to a combination of the type of a subject ECU and the type of a corresponding ECU; and performing an error detection according to the predetermined communication error detecting mode so selected.

11 Claims, 5 Drawing Sheets

| TYPE OF SUBJECT ECU (POWER SUPPLY OF SUBJECT ECU) | TYPE OF CORRESPONDING ECU (POWER SUPPLY OF CORRESPONDING ECU) | MODE TO BE SELECTED |
|---|---|---|
| FIRST TYPE (IG1) | FIRST TYPE (IG1) | FIRST MODE |
| FIRST TYPE (IG1) | SECOND TYPE (IG2) | SECOND MODE |
| SECOND TYPE (IG2) | FIRST TYPE (IG1) | THIRD MODE |
| SECOND TYPE (IG2) | SECOND TYPE (IG2) | CONVENTIONAL MODE |

FIG. 1
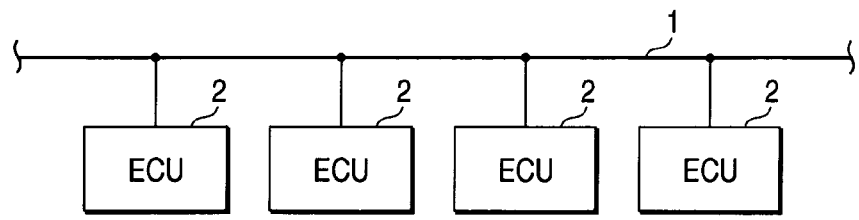
FIG. 2
|  | IGNITION KEY POSITIONS | | | |
|---|---|---|---|---|
|  | LOCK | ACC | ON | START |
| FIRST ECU (IG1 POWER SUPPLY) | OFF | ON | ON | ON |
| SECOND ECU (IG2 POWER SUPPLY) | OFF | OFF | ON | ON |
| THIRD ECU (ACC POWER SUPPLY) | OFF | ON | ON | OFF |
FIG. 3
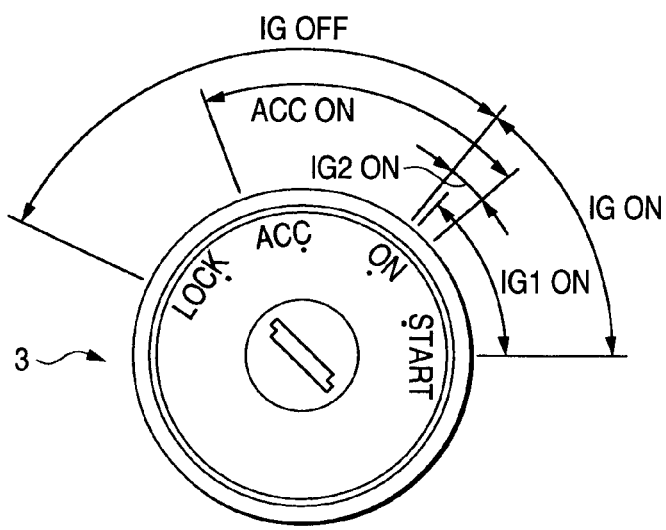

| TYPE OF SUBJECT ECU (POWER SUPPLY OF SUBJECT ECU) | TYPE OF CORRESPONDING ECU (POWER SUPPLY OF CORRESPONDING ECU) | MODE TO BE SELECTED |
|---|---|---|
| FIRST TYPE (IG1) | FIRST TYPE (IG1) | FIRST MODE |
| FIRST TYPE (IG1) | SECOND TYPE (IG2) | SECOND MODE |
| SECOND TYPE (IG2) | FIRST TYPE (IG1) | THIRD MODE |
| SECOND TYPE (IG2) | SECOND TYPE (IG2) | CONVENTIONAL MODE |

… the entire contents of which are hereby incorporated by reference.

COMMUNICATION ERROR DETECTING METHOD FOR BUS COMMUNICATION NETWORK IN VEHICLE

This Nonprovisional application claims priority under 35 U.S.C. § 119(a) on Patent Application No(s). 2002-255029 filed in JAPAN on Aug. 30, 2002, the entire contents of which are hereby incorporated by reference.

BACKGROUND OF THE INVENTION

1. Field of the Invention

The present invention relates to a communication error detecting method for a bus communication network in a vehicle.

2. Background Art

In general, a plurality of electronic control units (ECU's) are installed on a vehicle for electronically controlling a plurality of actuators, respectively. Each ECU is designed to electronically control an actuator connected to the subject ECU while transmitting and receiving data between the subject ECU and a corresponding ECU through a communication via a multiplex transmission pathway.

When there occurs an abnormality in the ECU's or the multiplex transmission pathway in such a vehicle multiplex communication system, data transmission cannot be performed or is inappropriately performed between the ECU's. Accordingly, there is a fear that a proper electronic control will not be performed. To deal with this, generally, each ECU is provided with a communication error detecting function for determining the existence of an abnormality in the corresponding ECU or the transmission pathway. For example, as described in JP-UM-B-7-23722, each ECU is designed to determine that an abnormality has occurred in the corresponding ECU or the transmission pathway when the subject ECU cannot receive data from the corresponding ECU over a predetermined period of time or longer.

Here, these ECU's constituting the vehicle multiplex communication system are generally divided into the ECU's which are powered on whether the ignition key is situated at the OFF position or the ON position and the ECU's which are powered on only when the ignition key is situated at the ON position. Since the latter ECU's are kept inoperative while the ignition key remains at the OFF position and hence no transmission of data is enabled, in case a communication detection is performed by the former ECU which can be operative even when the ignition key is situated at the OFF position, there may occur a case where the latter ECU is erroneously determined to have failed. Then, conventionally, the communication error detection is designed to be stopped when the ignition key is situated at the OFF position so as to prevent the occurrence of such an erroneous determination.

On the other hand, with a view to reducing the load of a battery at the time of cranking, there occurs sometimes a case where a multiplex communication system is configured in which part of the ECU's are powered off when the ignition key is situated at a cranking position. In the following description, an ECU which is powered on even at the time of cranking is referred to as a first type ECU and an ECU which is powered off at the time of cranking is referred to as a second type ECU.

In the multiplex communication system configured as described above, there exist first type ECU's and second type ECU's in a mixed fashion. Since a communication error detection is performed by the first type ECU when the ignition key is situated at the cranking position (which, broadly speaking, corresponds to the ON position), even if there is provided a countermeasures is taken to stop the communication error detection when the ignition key is situated at the OFF position, there may be caused a risk that the second type ECU is determined to have failed.

SUMMARY OF THE INVENTION

It is an object of the invention to provide a communication error detecting method which can ensure the prevention of an erroneous determination when a communication error detection is performed in a bus communication network in which the first type ECU's and the second type ECU's are provided in the mixed fashion.

To achieve the object, the invention provides a communication error detecting method for a bus communication network including a first type ECU which is powered on whether an ignition key is situated at an ON position or a cranking position and a second type ECU which is powered on when the ignition key is situated at the ON position and which is powered off when the ignition key is situated at the cranking position.

The communication error detecting method includes: selecting a predetermined detecting mode from a plurality of detecting modes according to a combination of the type of a subject ECU and the type of a corresponding ECU; and performing an error detection according to the predetermined communication error detecting mode so selected.

Preferably, the plurality of detecting modes include at least one of a first communication error detecting mode in which the communication error detection is stopped when a generated supply voltage is lower than a predetermined voltage whether the ignition key is situated at the ON position or the cranking position, a second communication error detecting mode in which a communication error detection is stopped when the ignition key is situated at the cranking position, and a third communication error detecting mode in which a communication error detection is stopped when a vehicle speed is slower than a predetermined vehicle speed.

In the vehicle bus communication network, a battery is used, in general, as a source of power supply. As the residual capacity of the battery lowers, the supply voltage lowers, in particular, at the time of cranking. A communication error tends to be caused between the ECU's due to the reduced supply voltage, leading to a risk that an erroneous detection is caused in performing a communication error detection.

In addition, at the time of cranking, while the first type ECU is powered on, the second type ECU is powered off and is then brought to an inoperable condition. Therefore, when a communication error detection is performed by the first type ECU, there may be caused a risk that the second type ECU is erroneously determined to have failed.

In addition, as will be discussed in detail when describing an embodiment of the invention later on, strictly speaking, there may occur sometimes a case where the first type ECU and the second type ECU have different timings of initiating and completing power supply thereto. For example, there may occur a case where the timing of initiating a power supply to the second type ECU becomes slightly earlier than that to the first type ECU and the timing of completing the power supply to the second ECU becomes slightly later than that to the first type ECU.

In this situation, where the subject ECU is the second type ECU and the corresponding ECU is the first type ECU, when the ignition key is operated slowly, the ECU which is activated earlier performs a communication error detection on the corresponding ECU. As a result, there may be caused a risk that the corresponding ECU is determined to be abnormal.

According to the invention, however, each ECU is designed to select a communication error detecting mode according to a combination of the type of the subject ECU and the type of the corresponding ECU among from the following communication error detecting modes: the first communication error detecting mode in which an erroneous determination due to the reduced supply voltage can be prevented; the second communication error detecting mode in which an erroneous determination in association with cranking can be prevented; and the third communication error detecting mode in which an erroneous determination can be prevented which occurs when the predetermined vehicle speed has not yet been reached (or when there exists a risk that the ignition key is not properly situated at the ON position). Accordingly, the risk of occurrence of an erroneous determination is eliminated or reduced.

Further, the invention provides a vehicle including: an ignition switch switchable at least between an ON position and a cranking position; a bus communication network including a first type ECU and a second type ECU; and a power supply source for supplying power to the first type ECU and the second type ECU; wherein the first type ECU is powered on whether the ignition switch is at the ON position or the cranking position; the second type ECU is powered on when the ignition switch is at the ON position and is powered off when the ignition switch is at the cranking position; and the first type ECU and the second type ECU select a predetermined detecting mode from a plurality of detecting modes according to a combination of the type of a subject ECU and the type of a corresponding ECU to perform an communication error detection according to the predetermined communication error detecting mode so selected.

Further, the invention provides a bus communication network in a vehicle, including: a first type ECU which is powered on whether an ignition switch in the vehicle is at an ON position or a cranking position; a second type ECU which is powered on when the ignition switch is at the ON position and is powered off when the ignition switch is at the cranking position; and a bus for connecting the first type ECU and the second type ECU; wherein the first type ECU and the second type ECU select a predetermined detecting mode from a plurality of detecting modes according to a combination of the type of a subject ECU and the type of a corresponding ECU; and one of the first type ECU and the second type ECU performs an error detection of communication with the other according to the predetermined communication error detecting method.

BRIEF DESCRIPTION OF THE DRAWINGS

The present invention may be more readily described with reference to the accompanying drawings:

FIG. 1 is a schematic block diagram showing a bus communication network to which a communication error detecting method according to one embodiment of the invention is applied.

FIG. 2 is a table illustrating relationships between power on and off conditions of each of first to third type ECU's provided on the communication network shown in FIG. 1 and ignition key positions.

FIG. 3 is a diagram showing relationships between switching positions of the ignition key and ON's/OFF's of power supplies.

DETAILED DESCRIPTION OF THE PREFERRED EMBODIMENTS

A communication error detecting method for a bus communication network according to an embodiment of the invention will be described below by reference to the accompanying drawings.

As shown in FIG. 1, a vehicle bus communication network to which a communication error detecting method according to an embodiment of the invention is applied has a plurality of ECU's 2 which are connected to a bus 1 as a multiplex transmission pathway (of the plurality of ECU's, four ECU's are shown in FIG. 1). Each ECU is made up of a first, second or third type ECU (hereinafter, referred to as first to third ECU's). Here, the first to third ECU'S are different from one another in condition where they are powered on and off in relation to ignition key positions, as shown in FIG. 2. In relation to this, an IG1 power supply, an IG2 power supply and an accessory (ACC) power supply are connected to a battery (not shown) via, for example, an ignition switch 3 and an electric circuit (not shown) and are designed to be powered on and off according to the ignition key positions (refer to FIG. 2). In addition, the ignition switch 3 is designed, as conventionally known, to be operated manually to be switched among a LOCK position, an accessory (ACC) position, an ON position and a START position, as shown in FIG. 3.

Consequently, with the ignition key is situated at the LOCK position or the ACC position, a power supply to the first ECU from the IG1 power supply is cut off and the first ECU is powered off. With the ignition key being situated at the ON position or the START position, the power supply to the first ECU is effected, and the first ECU is powered on. In addition, with the ignition key being situated at the ON position, the second ECU is powered on. With the ignition switch 3 being situated at any other positions, the second ECU is powered off. On the other hand, with the ignition key being situated at the LOCK position or the START position, the third ECU is powered off. With the ignition switch 3 being situated at the ACC position or the ON position, the third ECU is powered on.

Among ECU's, an engine control ECU and a meters control ECU belong to the first ECU, an air conditioner control ECU belongs to the second ECU, and a compartment illumination control ECU belongs to the third ECU.

Each ECU 2 is designed to perform a communication error detection in which whether or not a corresponding (transmission initiator) ECU or a bus associated therewith is abnormal is determined.

Figure 4:
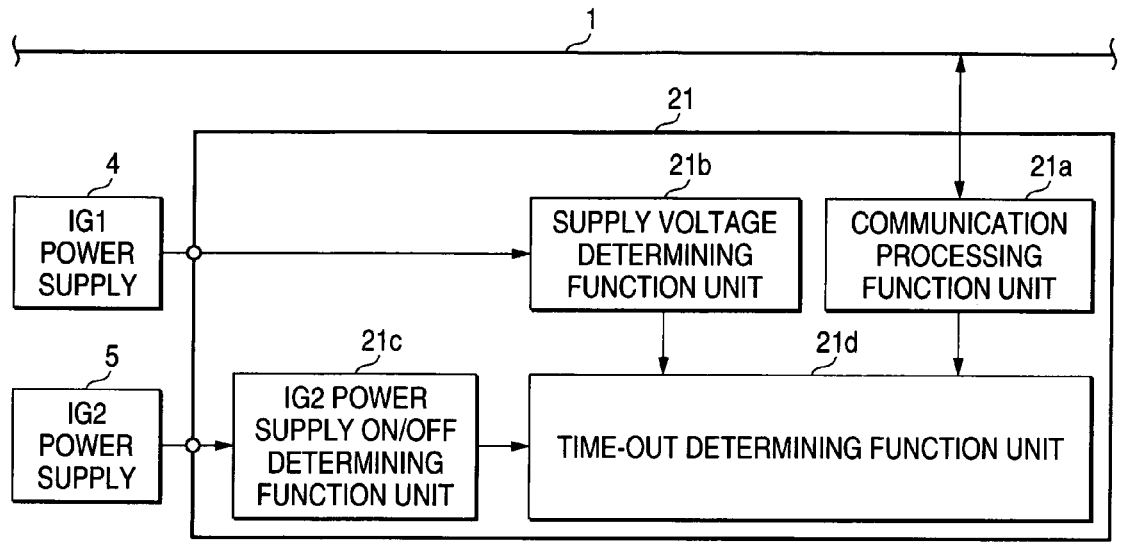
FIG. 4 is a block diagram showing a first type ECU provided on the communication network shown in FIG. 1.

Namely, as shown in FIG. 4, the first ECU 21 has a communication processing function unit 21a connected to a bus 1, a supply voltage determining function unit 21b connected to a IG1 power supply 4 via an electric wire, a power supply ON/OFF determining function unit 21c connected to an IG2 power supply 5 via an electric wire and a time-out determining function unit 21d which performs a communication error detection. An input side of the time-out determining function unit 21d is connected to output sides of the communication processing function unit 21a, the supply voltage determining function unit 21b and the IG2 power supply ON/OFF determining function unit 21c, respectively.

As will be described in detail later on, the first ECU 21 is designed to select a first communication error detecting mode when the corresponding ECU is the first type ECU, select a second communication error detecting mode when the corresponding ECU is the second type ECU and perform the communication error detecting mode so selected.

A table (not shown) in which data receiving timings are related to corresponding ECU's, for example, is stored in the first ECU 21 in order to determine the type of a corresponding ECU, and the first ECU 21 determines a corresponding ECU by reference to the table every time it receives data so as to select the first or second communication error mode.

Figure 5:
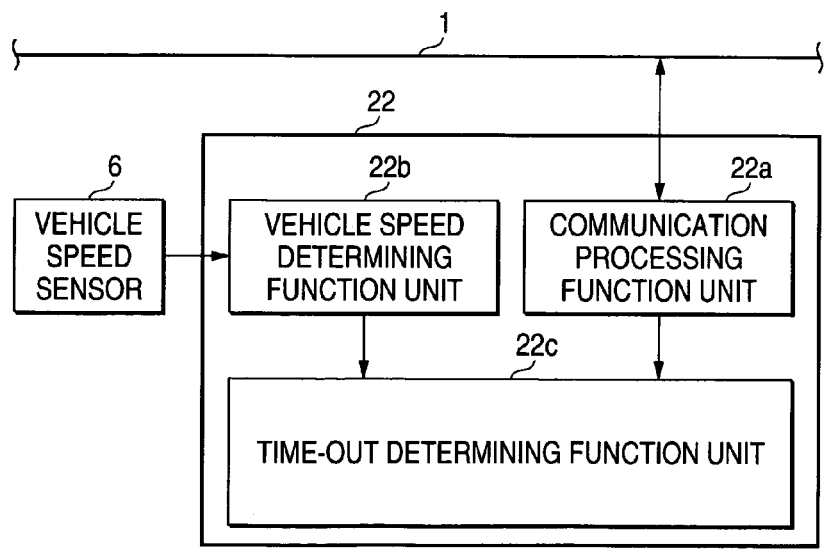
FIG. 5 is a block diagram showing a second type ECU provided on the communication network shown in FIG. 1.

As shown in FIG. 5, the second ECU 22 has a communication processing function unit 22a connected to the bus 1, a vehicle speed determining function unit 22b connected to a vehicle speed sensor 6 placed in the vicinity of a speedometer (not shown) via an electric wire and a time-out determining function unit 22c which performs a communication error detection, and an input side of the time-out determining function unit 22c is connected to output sides of the communication processing function unit 22a and the vehicle speed determining function unit 22b, respectively.

Similar to the case of the first ECU 21, the second ECU 22 is designed to determine by reference to a table (not shown) incorporated therein whether a corresponding ECU is the first type ECU or the second type ECU every time it receives data, and is also designed to select a third communication error detecting mode when the corresponding ECU is the first type ECU so as to perform a communication error detection and to perform a conventionally known communication error detection when the corresponding ECU is the second type ECU.

Figure 6:
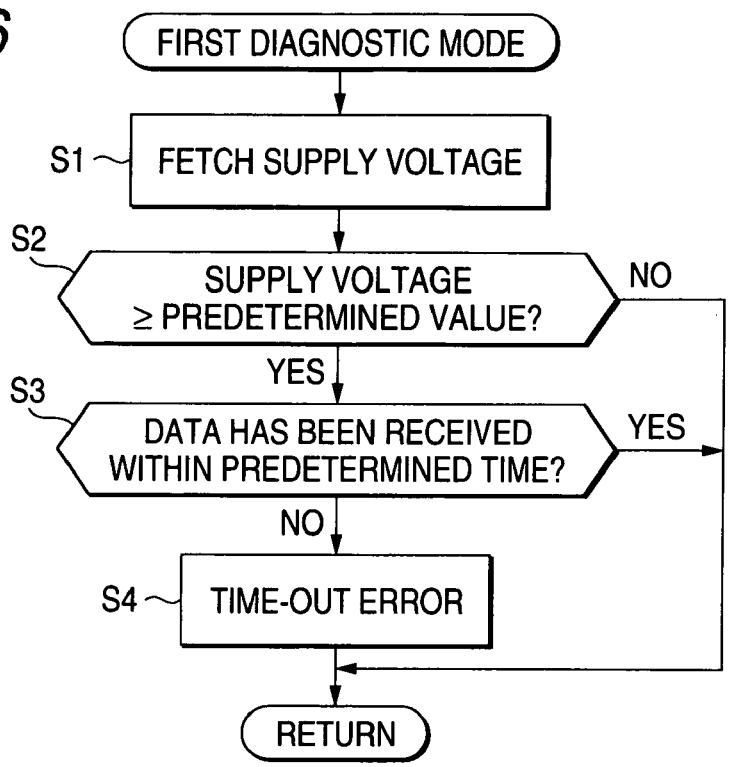
FIG. 6 is a flowchart of a communication error detecting routine based on a first communication error detecting mode effected by the first type ECU shown in FIG. 2.

In the communication network configured as has been described above, when it determines that the corresponding ECU is the first type ECU, each first ECU 21 selects the first communication error detecting mode in order to prevent an erroneous determination in detecting a communication error which would be caused by a reduction in supply voltage even in a combination in which the subject ECU and corresponding ECU are both the first ECU and executes a communication error detecting routine shown in FIG. 6 on a predetermined cycle.

In the communication error detecting routine shown in FIG. 6, a supply voltage is fetched by the supply voltage determining function unit 21b (step S1), and whether or not the supply voltage so fetched is equal to or larger than a predetermined voltage is determined (step S2). If the result of the determination is positive (Yes) or the supply voltage is determined to be equal to or larger than the predetermined voltage, judging that there occurs no risk that an erroneous determination attributed to the reduction in supply voltage is made, the time-out determining function unit 21d waits to receive data which are regularly transmitted thereto from the corresponding ECU.

Here, in case the corresponding ECU and the bus associated therewith are not abnormal, the data from the corresponding ECU is supplied to the time-out determining function unit 21d before a predetermined time (for example, 1 to 2 seconds or a time corresponding to ten transmission cycles) has elapsed since a predetermined receiving timing.

Then, the time-out determining function unit 21d determines whether or not the data regularly transmitted from the corresponding ECU has been received before the predetermined time has elapsed since the predetermined receiving timing (step S3), and if the result of the determination is positive, or if the data from the corresponding ECU has been received properly, end the communication error detection in the current cycle without performing any time-out error determination.

If the result of the determination in step S3 is negative (No), or if the data transmitted from the corresponding ECU has not been received within the predetermined time, judging that the corresponding ECU or the associated bus is abnormal, the first ECU 21 determines that there is a time-out error (step S4).

Figure 7:
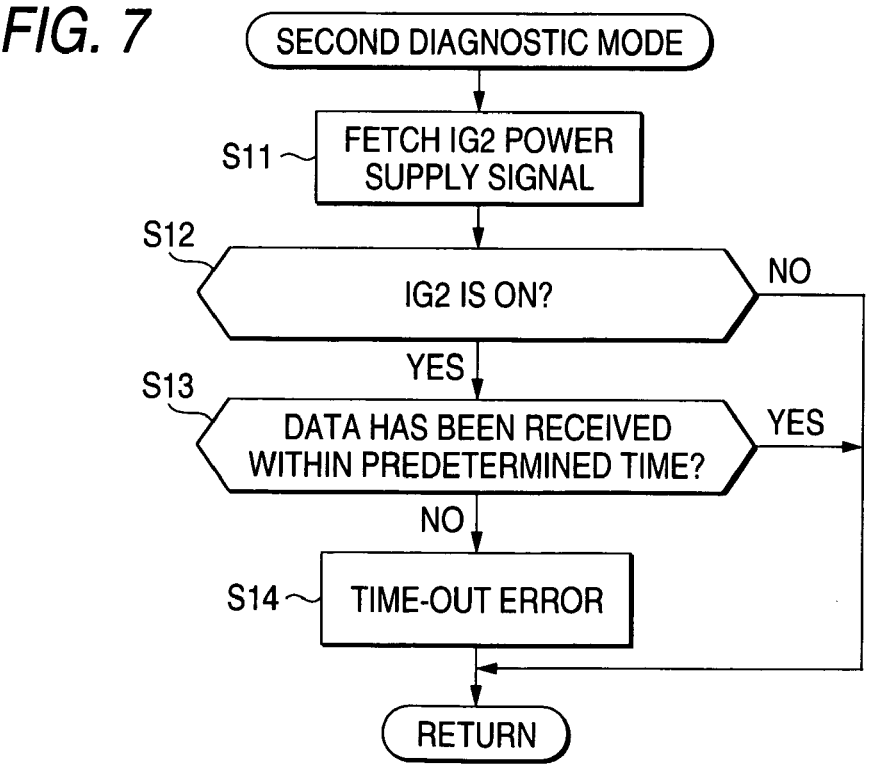
FIG. 7 is a flowchart of a communication error detecting routine based on a second communication error detecting mode effected by the first type ECU.

As has been described above, in a case where the corresponding ECU is the first ECU 21, while the communication error detection is performed based on the first communication error detecting mode which can prevent the erroneous determination attributed to the reduction in supply voltage, in a case where the corresponding ECU is the second ECU, in order to prevent an erroneous determination that may be caused at the time of cranking in a combination in which the subject ECU is the first ECU and the corresponding ECU is the second ECU, a communication error detecting routine shown in FIG. 7 is executed on a predetermined cycle so as to perform a communication error detection based on the second communication error detecting mode.

In the communication error detecting routine shown in FIG. 7, an IG2 power supply signal is fetched by the IG2 power supply ON/OFF determining function unit 21c (step S11), and whether or not the IG2 power supply is on is determined (step S12). If the result of the determination is positive or if the IG2 power supply 5 is on, no cranking occurs, and hence there is no risk that an erroneous determination is made which occurs in association with cranking in detecting a communication error, a communication error detection being then initiated.

Namely, the time-out determining function unit 21d determines whether or not data transmitted from the corresponding ECU has been received within a predetermined time from a predetermined receiving timing (step S13), and if it is determined that the data from the corresponding ECU has been received properly, end the communication error detection in the current cycle without performing any time-out error detection. In contrast, if it is determined that the data from the corresponding ECU has not been received within the predetermined time, judging that the corresponding ECU or the bus associated therewith is abnormal, the time-out determining function unit 21d determines that there occurs a time-out error (step S14).

In addition, as to a case where the corresponding ECU is the third ECU, while a flowchart and description thereof are omitted, since there is caused a risk that an erroneous determination is made when a communication error detection is effected at the time of cranking by the first ECU even in a combination in which the subject ECU is the first ECU and the corresponding ECU is the third ECU, when the corresponding ECU is the third ECU, the first ECU 21 stops the communication error detection while cranking. While a description of the case in which the corresponding ECU is the third ECU will be omitted below, a communication error detection is performed which corresponds to the communication error detection carried out when the corresponding ECU is the second ECU.

Thus, as has been described above, each of the first ECU's 21 performs the communication error detection based on the first or second communication error detecting mode according to the type of the corresponding ECU.

In contrast to this, each of the second ECU's 22 performs the communication error detection based on the third communication error detecting mode or the conventionally known communication error detection according to the type of the corresponding ECU. Here, the third communication error detecting mode is intended to prevent an erroneous determination attributed to the fact that power supply initiation and completion timings are different between the first ECU and the second ECU.

Firstly, the reason will be described why the power supply initiation and completion timings are slightly different between the first ECU 21 and the second ECU 22. In the configuration illustrated in FIGS. 2 and 3, when the ignition switch 3 is operated to be switched from the ACC position to the ON position, to be exact, the IG2 power supply is switched from ON to OFF slightly earlier than the IG1 power supply. In addition, when the ignition switch 3 is operated to be switched from the ON position to the ACC position, strictly speaking, the IG2 is switched from ON to OFF slightly later than the IG1 power supply. In other words, the timing of initiation of the power supply to the second ECU 22 happens slightly earlier than the timing of initiation of the power supply to the first ECU 21, and the timing of completion of the power supply to the second ECU 22 happens slightly later than the timing of completion of the power supply to the first ECU 21.

In the configuration like this, when the subject ECU is the second ECU, while the corresponding ECU is the first ECU and the ignition switch 3 is slowly operated to be switched between the ACC position and the ON position, there maybe caused a risk that a communication error detection is effected while the corresponding ECU is in an inoperable condition to thereby determine that the corresponding ECU is abnormal.

Figures 8, 9:
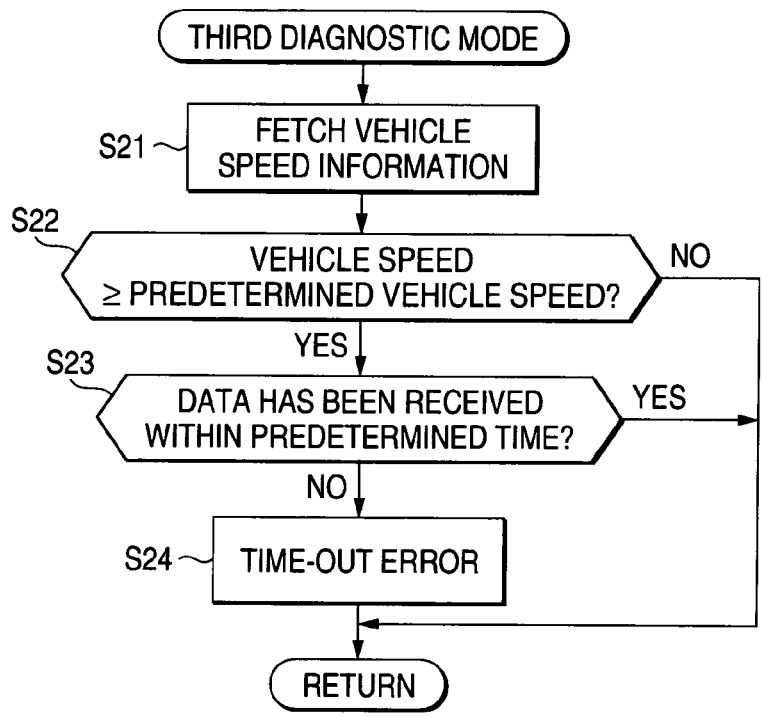
FIG. 8 is a flowchart of a communication error detecting routine based on a third communication error detecting mode effected by the second type ECU.
FIG. 9 is a table showing relationships between combinations of a subject ECU and a corresponding ECU and the communication error detecting modes in the embodiment of the invention.

In order to avoid the erroneous determination as has been described above, when determining that the corresponding ECU is the first ECU, the second ECU 22 effects a communication error detecting routine shown in FIG. 8 on a predetermined cycle with a view to effecting a communication error detection based on the third communication error detecting mode.

In the communication error detecting routine shown in FIG. 8, vehicle speed information is fetched by the vehicle speed determining function unit 22b (step S21), and whether or not the vehicle speed is equal to or faster than a predetermined vehicle speed (step S22). If the result of the determination is positive (Yes) or if it is determined that the vehicle speed exceeds the predetermined vehicle speed, it is judged that the vehicle is running with the ignition switch 3 having been situated at the ON position and hence that there is caused no risk that an erroneous determination such as to be made before the ignition switch 3 is properly situated at the ON position is made.

In this case, the time-out determining function unit 22c of the second ECU 22 determines whether or not data transmitted from the corresponding ECU has been received within a predetermined time from a predetermined receiving timing (step S23). If it is determined that the data from the corresponding ECU has been properly received, end the communication error detection in the current cycle without performing any time-out error determination. Whereas if it is determined that the data transmitted from the corresponding ECU has not been received within the predetermined time, judging that the corresponding ECU or the bus associated therewith is abnormal, the time-out determining function unit 22c determines that there occurs a time-out error (step S24).

Thus, as has been described above, the second ECU 22 performs the communication error detection based on the third communication error detecting mode when the corresponding ECU is the first ECU to thereby prevent the erroneous determination attributed to the slight difference in the power supply initiation and completion timings between the first ECU and the second ECU. When the corresponding ECU is the second ECU, however, since there is caused no risk that such an erroneous determination is made, as is conventionally known, a time-out error determination is made which is made based on whether or not the data transmitted from the corresponding ECU has been received within the predetermined time from the predetermined receiving timing.

As has been described heretofore, according to the embodiment, each ECU 2 is designed to select the first communication error detecting mode when the subject ECU and the corresponding ECU are both the first type ECU which uses the IG1 power supply as the source of supply voltage, select the second communication error detecting mode when the subject ECU is the first type ECU, while the corresponding ECU is the second type ECU which uses the IG2 power supply as the source of supply voltage and select the third communication error detecting mode when the subject ECU is the second type ECU, while the corresponding ECU is the first type ECU (FIG. 9).

Thus, since the communication error detection is prohibited when the supply voltage is lowered, cranking is carried out and the ignition switch 3 is operated to be switched, there is no case where the erroneous determination is made even when a communication failure is temporarily caused due to the reduction in the supply voltage which operates the ECU's which is associated with the reduction in supply voltage or cranking or the communication is temporarily made impossible due to an interruption of power supply to the ECU's that occurs when the ignition switch 3 is operated to be switched between the ACC position and the ON position.

The invention is not limited to the embodiment but may be modified variously.

For example, while, in the embodiment, the first communication error detecting mode is selected when the subject ECU and the corresponding ECU are both the first ECU, instead of this, the second or third communication error detecting mode may be selected. In addition, while, in the embodiment, the second communication error detecting mode is selected when the subject ECU is the first ECU, while the corresponding ECU is the second ECU, the third communication error detecting mode may be selected.

Figure 10:
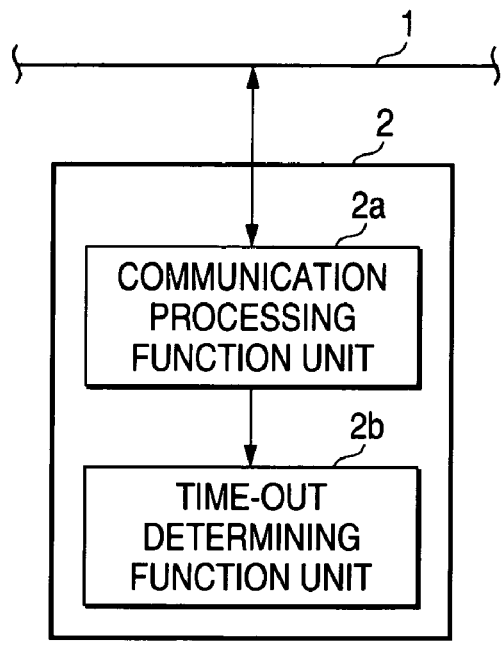
FIG. 10 is a schematic block diagram of an ECU according to a modified example of the invention.
Figure 11:
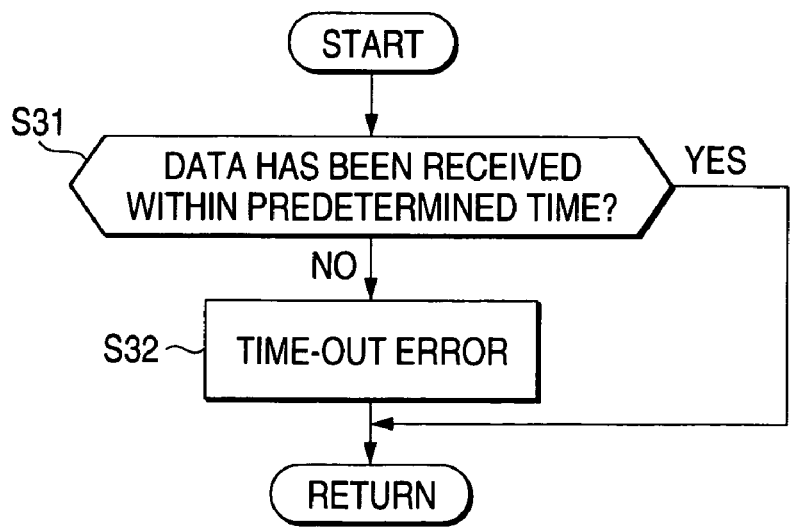
FIG. 11 is a flowchart of a communication error detecting routine effected by the ECU shown in FIG. 10.

In addition, while, in the embodiment, the first and second ECU's are configured as illustrated in FIGS. 4 and 5, respectively, in order to effect the communication error detecting method according to the invention, the configurations of both the first and second ECU's are not limited those illustrated in the respective diagrams. For example, the first and second ECU's can be made up of a communication processing function unit 2a connected to the bus 1 and a time-out determining function unit 2b connected to the communication processing function unit 2a, as shown in FIG. 10. In this case, the time-out determining function unit 2b effects, for example, a communication error detecting routine shown in FIG. 11. In step S31 in the same routine, whether or not data regularly transmitted from the corresponding ECU has been received within a predetermined time from a predetermined receiving timing is determined, and if the result of the determination is negative, or if the data has not been received within the predetermined time, then it is determined in step S32 that there exists a time-out error. However, the predetermined time used as a determination criterion in step S31 is set to quite a longer time (for example, about one minute) than the normal cranking time, whereby an erroneous determination associated with cranking in detecting a communication error can be prevented but it becomes impossible to detect a temporary communication failure that occurs before the predetermined time of one minute has elapsed since the receiving timing arrived.

What is claimed is:

1. A communication error detecting method for a bus communication network including a first type ECU which is powered on whether an ignition key is situated at an ON position or a cranking position and a second type ECU which is powered on when the ignition key is situated at the ON position and which is powered off when the ignition key is situated at the cranking position, the communication error detecting method comprising:

selecting a predetermined communication error detecting mode from a plurality of communication error detecting modes according to a combination of the type of a subject ECU and the type of a corresponding ECU; and performing an error detection according to the predetermined communication error detecting mode so selected.

2. The communication error detecting method as claimed in claim 1, wherein the plurality of detecting modes include at least one of a first communication error detecting mode in which a communication error detection is stopped when a generated supply voltage is lower than a predetermined voltage whether the ignition key is situated at the ON position or the cranking position, a second communication error detecting mode in which a communication error detection is stopped when the ignition key is situated at the cranking position, and a third communication error detecting mode in which a communication error detection is stopped when a vehicle speed is slower than a predetermined vehicle speed.

3. The communication error detecting method as claimed in claim 2, wherein in the selecting step, the first communication error detecting mode is selected when both the subject ECU and the corresponding ECU are the first type ECU.

4. The communication error detecting method as claimed in claim 2, wherein in the selecting step, the second communication error detecting mode is selected when the subject ECU is the first type ECU and the corresponding ECU is the second type ECU.

5. The communication error detecting method as claimed in claim 2, wherein in the selecting step, the third communication error detecting mode is selected when the subject ECU is the second type ECU and the corresponding ECU is the first type ECU.

6. A vehicle comprising:

an ignition switch switchable at least between an ON position and a cranking position;

a bus communication network including a first type ECU and a second type ECU; and a power supply source for supplying power to the first type ECU and the second type ECU;

wherein the first type ECU is powered on whether the ignition switch is at the ON position or the cranking position;

the second type ECU is powered on when the ignition switch is at the ON position and is powered off when the ignition switch is at the cranking position; and the first type ECU and the second type ECU select a predetermined detecting mode from a plurality of detecting modes according to a combination of the type of a subject ECU and the type of a corresponding ECU to perform an communication error detection according to the predetermined communication error detecting mode so selected.

7. The vehicle as claimed in claim 6, wherein the plurality of detecting modes include at least one of a first communication error detecting mode, a second communication error detecting mode and a third communication error detecting mode;

in the first communication error detecting mode, the communication error detection is stopped when a supply voltage from the power supply source is lower than a predetermined voltage whether the ignition switch is switched at the ON position or the cranking position;

in the second communication error detecting mode, the communication error detection is stopped when the ignition switch is switched at the cranking position; and in a third communication error detecting mode, the communication error detection is stopped when a vehicle speed is slower than a predetermined vehicle speed.

8. The vehicle as claimed in claim 7, wherein the first communication error detecting mode is selected when both the subject ECU and the corresponding ECU are the first type ECU.

9. The vehicle as claimed in claim 7, wherein the second communication error detecting mode is selected when the subject ECU is the first type ECU and the corresponding ECU is the second type ECU.

10. The vehicle as claimed in claim 7, wherein the third communication error detecting mode is selected when the subject ECU is the second type ECU and the corresponding ECU is the first type ECU.

11. A bus communication network in a vehicle, comprising:

a first type ECU which is powered on whether an ignition switch in the vehicle is at an ON position or a cranking position;

a second type ECU which is powered on when the ignition switch is at the ON position and is powered off when the ignition switch is at the cranking position; and a bus for connecting the first type ECU and the second type ECU;

wherein the first type ECU and the second type ECU select a predetermined detecting mode from a plurality of detecting modes according to a combination of the type of a subject ECU and the type of a corresponding ECU; and one of the first type ECU and the second type ECU performs an error detection of communication with the other according to the predetermined detecting mode.

* * * * *